United States Patent
Berggren et al.

(10) Patent No.: US 11,013,051 B2
(45) Date of Patent: May 18, 2021

(54) ESTABLISHING OR RESUMING A WIRELESS COMMUNICATION CONNECTION IN A WIRELESS COMMUNICATION NETWORK

(71) Applicants: Sony Mobile Communications Inc., Tokyo (JP); Sony Corporation, Tokyo (JP)

(72) Inventors: Anders Berggren, Lund (SE); Lars Nord, Lund (SE); Brian Alexander Martin, Weybridge (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/317,551

(22) PCT Filed: Jul. 15, 2016

(86) PCT No.: PCT/EP2016/066958
§ 371 (c)(1),
(2) Date: Jan. 13, 2019

(87) PCT Pub. No.: WO2018/010820
PCT Pub. Date: Jan. 18, 2018

(65) Prior Publication Data
US 2019/0239273 A1    Aug. 1, 2019

(51) Int. Cl.
*H04W 76/19* (2018.01)
*H04W 76/12* (2018.01)
(Continued)

(52) U.S. Cl.
CPC ............ *H04W 76/19* (2018.02); *H04W 76/11* (2018.02); *H04W 76/12* (2018.02); *H04W 76/14* (2018.02); *H04W 4/70* (2018.02); *H04W 88/04* (2013.01)

(58) Field of Classification Search
CPC ......... H04W 4/70; H04W 4/80; H04W 40/22; H04W 76/14; H04W 76/23; H04W 80/02; H04W 88/04
See application file for complete search history.

(56) References Cited

U.S. PATENT DOCUMENTS

2016/0156404 A1    6/2016 Wolfner
2016/0360563 A1*  12/2016 Lecroart ............... H04L 69/322
(Continued)

FOREIGN PATENT DOCUMENTS

EP      2723143 A1    4/2014
WO   2015125479 A1    2/2015

OTHER PUBLICATIONS

International Search Report and Written Opinion from counterpart International Patent Application No. PCT/EP2016/066958 dated Mar. 15, 2017, 9 pages.

(Continued)

*Primary Examiner* — Pao Sinkantarakorn
(74) *Attorney, Agent, or Firm* — Tucker Ellis LLP

(57) ABSTRACT

The present invention relates to a method for establishing or resuming a wireless communication connection in a wireless communication network. According to the method, a first message is transmitted from a first device to a second device. The first message includes a request for the second device to provide a data link layer communication forwarding between the first device and a base station. Furthermore, a connection between the first device and the base station is established or resumed via the data link layer communication forwarding of the second device.

12 Claims, 4 Drawing Sheets

(51) Int. Cl.
    *H04W 76/11*    (2018.01)
    *H04W 76/14*    (2018.01)
    *H04W 88/04*    (2009.01)
    *H04W 4/70*    (2018.01)

(56) References Cited

U.S. PATENT DOCUMENTS

| | | | |
|---|---|---|---|
| 2018/0020442 A1* | 1/2018 | Nair | H04W 12/04 |
| 2018/0213577 A1* | 7/2018 | Burbidge | H04W 76/10 |
| 2019/0028947 A1* | 1/2019 | Adachi | H04W 76/14 |

OTHER PUBLICATIONS

3rd Generation Partnership Project (3GPP), "Study on Architecture Enhancements for Cellular Internet of Things," Technical Report 3GPP TR 23.720 (release 13), Mar. 2016, 94 pages.

* cited by examiner

ESTABLISHING OR RESUMING A WIRELESS COMMUNICATION CONNECTION IN A WIRELESS COMMUNICATION NETWORK

FIELD OF THE INVENTION

The present invention relates to a method for establishing or resuming a wireless communication connection in a wireless communication network, in particular to a method for establishing or resuming a wireless communication connection between a first device and a base station via a second device. The present invention relates furthermore to a first device, a second device, a base station, and a system implementing the method.

BACKGROUND OF THE INVENTION

Mobile and wireless communication is becoming more popular with new applications in the field of mobile autonomous reporting, like for example smoke alarm detectors, power failure notifications from smart meters, tamper notifications, smart metering reports for gas, water, and electricity, smart agriculture, smart environment, and in the field of network command and control, like for example home automation and vehicle tracking and monitoring. A lot of these applications may be implemented in compact battery-powered devices, so-called Internet of Things (IoT) devices or wearable devices. Preferably, for universal use, such devices may communicate via cellular wireless communication networks, for example LTE (Long Term Evolution).

A wireless communication of IoT devices within a cellular network is studied in the 3rd Generation Partnership Project (3GPP) as disclosed for example in the Technical Report 3GPP TR 23.720 (release 13). In this context, IoT devices communicating within a cellular network are also called Cellular Internet of Things (CIoT) devices.

In particular in connection with CIoT terminal devices the following requirements may be considered. As these terminal devices are frequently battery-powered, a low power consumption may contribute to improve battery life time. Radio frequency signaling of a radio interface during connection setup and data communication may increase the electrical power consumption, in particular in case of a long distance between the CIoT device and a base station. A so-called device-to-device (D2D) may be utilized to reduce power consumption. Commonly, the device-to-device communication is used for a data communication and data exchange between two or more terminal devices via direct radio links. However, a device-to-device communication may also be utilized for communication with the cellular wireless communication network via another device. For example, a terminal device may not communicate directly with a base station, but indirectly via a so-called relay device, which may be another communication terminal device of the wireless communication network. A communication link, a so-called sidelink or D2D-link, is established between the terminal device and the relay device, and a further communication link is established between the relay device and the base station. This enables the terminal device to communicate with the wireless communication network using a short range radio frequency communication to the relay device, thus saving electrical energy.

However, when communicating data via a relay device, this may raise security problems, in particular as traditional device-to-device communication specifies the relay function as layer 3 relay (see for example 3GPP TS 23.303) or even as application layer relay.

Therefore, there is a need for a method and devices which address the above-described problems.

SUMMARY OF THE INVENTION

According to the present invention, this object is achieved by a method for establishing or resuming a wireless communication connection in a wireless communication network as defined in claim 1, a base station as defined in claim 11, a second device as defined in claim 13, a first device as defined in claim 15, and a system as defined in claim 17. The dependent claims define embodiments of the invention.

According to the present invention, a method for establishing or resuming a wireless communication connection in a wireless communication network is provided. The wireless communication connection may comprise a wireless communication connection from a first device of the wireless communication network to a base station of the wireless communication network via a second device of the wireless communication network. According to the method, a first message is transmitted from the first device to the second device. The first message includes a request for the second device to provide a data link layer communication forwarding between the first device and the base station. Then, a connection between the first device and the base station is established or resumed via the data link layer communication forwarding of the second device.

In other words, the second device establishes a data link layer switching functionality which forwards communication data between the first device and the base station. The data link layer communication forwarding relates to a forwarding of information in the data link layer according to the LTE protocol stack layers. The data link layer of the LTE protocol stack may comprise for example functions of the Medium Access Control (MAC), the Radio Link Control (RLC) and the Packet Data Convergence Protocol (PDCP). The data link layer is also called "layer 2" in the OSI model and a switch or switching functionality which operates in the data link layer is therefore also called "layer 2 switch".

By forwarding data in the data link layer in the second device, security features established in higher layers, for example in layer 3 or above, are not influenced or terminated in the second device thus maintaining a secured communication between the first device and the base station. For example, once the connection is established between the first device and the base station, then the data between these two nodes is protected by for example an end-to-end Non-Access Stratum (NAS) encryption or an Access Stratum (AS) encryption between the base station and the first device.

The radio protocol architecture of LTE systems can be separated into a control plane and a user plane. At the user plane side, an application may create data packets that are processed by protocols such as TCP, UDP and IP, while in the control plane, the Radio Resource Control (RRC) protocol generates signaling messages that are exchanged between the base station and a terminal device. In both cases the information is processed by the Packet Data Convergence Protocol (PDCP), the Radio Link Control (RLC) protocol and the Medium Access Control (MAC) protocol, before being passed to the physical layer for transmission. Usually, the signaling in the control plane is used to set up a user plane connection and the user plane connection is used for communicating user data (so-called user plane solution). However, in particular in connection with a communication of CIoT devices, only a so-called control plane solution may be setup, where some user data is conveyed to higher layers via the control plane.

The connection between the first device and the base station may be established or resumed via the data link layer communication forwarding of the second device by setting up a connection between the first device and the base station for controlling radio resources for the communication between the first device and the base station. For example, a communication connection may be established between the first device and the base station by communicating Radio Resource Control (RRC) protocol elements between the first device and the base station. These protocol elements are forwarded by the layer 2 switch of the second device without further processing of the protocol elements by the second device. In other words, a radio resource control (RRC) connection may be established between the first device and the base station via the data link layer communication forwarding of the second device with the first device and the base station acting as the peer entities of the RRC connection.

According to an embodiment, a second message is transmitted from the second device to the base station upon receiving the first message. The second message includes a request to the base station for a resource for the data link layer communication forwarding between the first device and the base station. The resource may comprise for example a radio bearer.

According to a further embodiment, the base station transmits a third message to the second device. The third message includes an indication of the resource for the data link layer communication forwarding between the first device and the base station.

The requested and granted resource may be used for creating a signaling tunnel between the base station and the first device. Data received from the first device is switched at the data link layer of the second device via the resource to the base station, and, vice versa, data received via the resource from the base station is switched at the data link layer of the second device to the first device. This resource may be the same for a plurality of first devices connected to the second device, and may therefore already exist, such that the second message is transmitted from the second device to the base station only in case the resource has not been requested for the data link layer communication forwarding at an earlier point in time.

The second message may include an indication that the requested resource is intended to be used for the data link layer communication forwarding between the first device and the base station. Therefore, this indication indicates that the second device establishes this resource for another cause then to transfer its own user data. In response to this indication, the base station may be prepared to accept a connection setup request or connection resume request from the first device via the data link layer communication forwarding without exchanging Random Access (RA) and Random Access Response (RAR) messages in advance, as it normally would have done in a conventionally defined in LTE system.

Consequently, according to another embodiment, for establishing or resuming the connection between the first device and the base station, a connection setup request or a connection resume request is transmitted from the first device to the base station via the data link layer communication forwarding of the second device. This request may be transmitted even without sending a random access message from the first device to the base station and without receiving a random access response message from the base station at the first device before.

Furthermore, according to another embodiment, the connection resume request, for example an RRC connection resume request, comprises a resume identifier which identifies a previous connection between the first device and the base station which has been suspended and is now to be resumed.

Furthermore, in case of a control plane solution, the first device may indicate by a corresponding identifier in the connection setup message, for example in a RRC connection request, that an RRC connection shall be set up to support further non-access stratum messages for a dialogue between the first device and a core network node of the wireless communication network. This is actually user plane information, transferred in a transparent container as part of a control plane message, for example an RRC connection setup complete message.

According to another embodiment, in particular in case the second device is in idle mode and thus not connected to the base station, the second message further includes a request to the base station for establishing a connection for controlling radio resources for a communication between the second device and the base station. For example, the second message may include a request to the base station for a radio resource control (RRC) connection for the communication between the second device and the base station. Thus, radio resource control connection requests of the first device and the second device are transmitted combined to the base station. The base station may respond to this request with a combined third message including not only the indication of the resource for the data link layer communication forwarding, but also a further indication of a resource for the communication between the second device and the base station, for example a further bearer. The second device may forward to the first device the resource information designated for the first device. Both the second device and the first device may send separate messages indicating radio resource control connection setup complete using the respective resources or bearers.

Furthermore, according to another embodiment, a fourth message is transmitted from the second device to the first device. The fourth message includes an identifier to be used for routing information to be sent from the first device via the data link layer communication forwarding to the base station. The identifier may comprise for example a resource identifier, a logical channel identifier or a Medium Access Control (MAC) identifier.

According to a further embodiment, payload information is transmitted between the first device and the base station via the data link layer communication forwarding of the second device. Due to the forwarding in the data link layer in the second device, encrypted payload information may be transmitted between the first device and the base station without being decrypted at the second device.

According to another aspect of the present invention, a base station for a wireless communication network is provided. The base station comprises a processing unit and a radio interface for communicating with a second device of the wireless communication network. The processing unit is configured to establish or resume a connection between a first device of the wireless communication network and the base station via a data link layer communication forwarding of the second device. The data link layer communication forwarding is provided by the second device upon transmitting a first message from the first device to the second device. The base station may comprise for example an evolved node B (eNB or eNodeB) as defined for LTE communication systems. The base station may be configured to perform the above described method and the embodiments thereof and comprises therefore also the above-described advantages.

According to an embodiment, the base station is configured to receive a second message from the second device. The second message is sent from the second device to the base station upon receiving the first message. The second message includes a request to the base station for a resource for the data link layer communication forwarding between the first device and the base station. The resource may comprise for example a radio bearer.

According to a further embodiment, the base station is configured to determine the requested resource and to transmit a third message to the second device. The third message includes an indication of the resource for the data link layer communication forwarding between the first device and the base station.

The requested and granted resource may be used for creating a signaling tunnel between the base station and the first device. Data received from the first device is switched at the data link layer of the second device via the resource to the base station, and, vice versa, data received via the resource from the base station is switched at the data link layer of the second device to the first device. This resource may be the same for a plurality of first devices connected to the second device, and may therefore already exist, such that the second message is transmitted from the second device to the base station only in case the resource has not been requested for the data link layer communication forwarding at an earlier point in time.

The second message may include an indication that the requested resource is intended to be used for the data link layer communication forwarding between the first device and the base station. Therefore, this indication indicates that the second device establishes this resource for another cause then to transfer its own user data. In response to this indication, the base station may be prepared to accept a connection setup request or connection resume request from the first device via the data link layer communication forwarding without exchanging Random Access (RA) and Random Access Response (RAR) messages in advance, as it normally would have done in a conventionally defined in LTE system.

Consequently, according to another embodiment, for establishing or resuming the connection between the first device and the base station, the base station is configured to receive a connection setup request or a connection resume request transmitted from the first device via the data link layer communication forwarding of the second device. This request may be received even without receiving a random access message from the first device at the base station and without transmitting a random access response message from the base station to the first device before.

Furthermore, according to another embodiment, the connection resume request, for example an RRC connection resume request, comprises a resume identifier which identifies a previous connection between the first device and the base station which has been suspended and is now to be resumed.

Furthermore, in case of a control plane solution, the first device may indicate by a corresponding identifier in the connection setup message, for example in a RRC connection request, that an RRC connection shall be set up to support further non-access stratum messages for a dialogue between the first device and a core network node of the wireless communication network.

According to another embodiment, in particular in case the second device is in idle mode and thus not connected to the base station, the second message further includes a request to the base station for establishing a connection for controlling radio resources for a communication between the second device and the base station. For example, the second message may include a request to the base station for a radio resource control (RRC) connection for the communication between the second device and the base station. Thus, radio resource control connection requests of the first device and the second device are transmitted combined to the base station. The base station may respond to this request with a combined third message including not only the indication of the resource for the data link layer communication forwarding, but also a further indication of a resource for the communication between the second device and the base station, for example a further bearer. The second device may forward to the first device the resource information designated for the first device. Both the second device and the first device may send separate messages indicating radio resource control connection setup complete using the respective resources or bearers.

According to a further embodiment, the base station is configured to transmit payload information between the first device and the base station via the data link layer communication forwarding of the second device. Due to the forwarding at data link layer in the second device, encrypted payload information may be transmitted between the first device and the base station without being decrypted at the second device.

According to a further aspect of the present invention, a second device for a wireless communication network is provided. The second device comprises a processing unit and at least one radio interface for communicating with a first device of the wireless communication network and a base station of the wireless communication network. The processing unit is configured to receive a first message from the first device. The first message includes a request for the second device to provide a data link layer communication forwarding between the first device and the base station of the wireless communication network. Furthermore, the processing unit is configured to provide the data link layer communication forwarding, for example for establishing or resuming a connection between the first device and the base station via the data link layer communication forwarding of the second device. The second device may be configured to perform the above-described method and embodiments thereof and comprises therefore also the above-described advantages.

The second device may comprise a mobile telephone, a smart phone, a personal digital assistant, a wearable electronic equipment, a mobile music player, a mobile computer, a tablet computer, or a mobile navigation system. A wearable electronic equipment, also called wearable device or smart mobile accessory, may comprise a wearable computer, also known as body born computer or simply wearable, which is a miniature electronic device that may be worn by a user under, with or on top of clothing. Thus, in principle, each terminal device configured to be operated in the wireless communication network may perform the above-described method for providing the data link layer communication forwarding.

According to an embodiment, the second device is configured to transmit a second message is to the base station upon receiving the first message. The second message includes a request to the base station for a resource for the data link layer communication forwarding between the first device and the base station. The resource may comprise for example a radio bearer.

According to a further embodiment, the second device is configured to receive a third message from the base station. The third message includes an indication of the resource for the data link layer communication forwarding between the first device and the base station.

The requested and granted resource may be used by the second device for creating a signaling tunnel between the base station and the first device. Data received from the first device is switched at the data link layer of the second device via the resource to the base station, and, vice versa, data received via the resource from the base station is switched at the data link layer of the second device to the first device. This resource may be the same for a plurality of first devices connected to the second device, and may therefore already exist, such that the second message is transmitted from the second device to the base station only in case the resource has not been requested for the data link layer communication forwarding at an earlier point in time.

The second message may include an indication that the requested resource is intended to be used for the data link layer communication forwarding between the first device and the base station. Therefore, this indication indicates that the second device establishes this resource for another cause then to transfer its own user data. In response to this indication, the base station may be prepared to accept a connection setup request or connection resume request from the first device via the data link layer communication forwarding without exchanging Random Access (RA) and Random Access Response (RAR) messages in advance, as it normally would have done in a conventionally defined in LTE system.

According to another embodiment, in particular in case the second device is in idle mode and thus not connected to the base station, the second message further includes a request to the base station for establishing a connection for controlling radio resources for a communication between the second device and the base station. For example, the second message may include a request to the base station for a radio resource control (RRC) connection for the communication between the second device and the base station. Thus, radio resource control connection requests of the first device and the second device are transmitted combined to the base station. The base station may respond to this request with a combined the third message including not only the indication of the resource for the data link layer communication forwarding, but also a further indication of a resource for the communication between the second device and the base station, for example a further bearer. The second device may be configured to receive the combined response from the base station and to forward to the first device the resource information designated for the first device. Both the second device and the first device may send separate messages indicating radio resource control connection setup complete using the respective resources or bearers.

Furthermore, according to another embodiment, the second device is configured to transmit a fourth message to the first device. The fourth message includes an identifier to be used for routing information to be sent from the first device via the data link layer communication forwarding to the base station. The identifier may comprise for example a resource identifier, a logical channel identifier or a Medium Access Control (MAC) identifier.

According to a further embodiment, the second device is configured to forward payload information transmitted between the first device and the base station via the data link layer communication forwarding of the second device. Due to the forwarding in the data link layer in the second device, encrypted payload information may be transmitted between the first device and the base station without being decrypted at the second device.

According to another aspect of the present invention, a first device for a wireless communication network is provided. The first device comprises a processing unit and the radio interface for communicating with a second device of the wireless communication network. The processing unit is configured to transmit a first message to the second device. The first message includes a request for the second device to provide a data link layer communication forwarding between the first device and a base station of the wireless communication network. Furthermore, the processing unit is configured to establish or resume a connection between the first device and the base station via the data link layer communication forwarding of the second device. Consequently, the first device may be configured to perform the above-described method and the embodiments thereof and comprises therefore also the above-described advantages.

The first device may comprise for example a mobile telephone, a tablet computer, a mobile computer, a wearable computer or an Internet of Things device. As the communication between the first device and the base station is relayed via the second device which may be located closer to the first device than the base station, electrical energy for radio transmissions may be saved. Furthermore, as the second device provides the data link layer communication forwarding, an end-to-end encryption between the first device and the base station may be established, such that communication data is protected from being tapped at the second device.

According to an embodiment, for establishing or resuming the connection between the first device and the base station, a connection setup request or a connection resume request is transmitted from the first device to the base station via the data link layer communication forwarding of the second device. This request may be transmitted even without sending a random access message from the first device to the base station and without receiving a random access response message from the base station at the first device before.

Furthermore, according to another embodiment, the connection resume request, for example an RRC connection resume request, comprises a resume identifier which identifies a previous connection between the first device and the base station which has been suspended and is now to be resumed.

Furthermore, in case of a control plane solution, the first device may indicate by a corresponding identifier in the connection setup message, for example in a RRC connection request, that an RRC connection shall be set up to support further non-access stratum messages for a dialogue between the first device and a core network node of the wireless communication network.

Furthermore, according to another embodiment, the first device is configured to receive a fourth message from the second device. The fourth message includes an identifier to be used for routing information to be sent from the first device via the data link layer communication forwarding to the base station. The identifier may comprise for example a resource identifier, a logical channel identifier or a Medium Access Control (MAC) identifier.

According to a further embodiment, payload information is transmitted between the first device and the base station via the data link layer communication forwarding of the second device. Due to the forwarding at data link layer in the second device, encrypted payload information may be transmitted between the first device and the base station without being decrypted at the second device.

According to another aspect of the present invention, a system is provided which includes at least one base station as described above, at least one first device as described above, and at least one second device as described above. Thus, the above-described method and the embodiments thereof may be performed in the system, and the system comprises therefore also the above-described advantages Although specific features described in the above summary and the following detailed description are described in connection with specific embodiments and aspects of the present invention, it should be noticed that the features of the exemplary embodiments and aspects described herein may be combined with each other unless specifically noted otherwise.

BRIEF DESCRIPTION OF THE DRAWINGS

The present invention will be described in more detail with reference to the accompanying drawings.

DETAILED DESCRIPTION OF EMBODIMENTS

In the following, exemplary embodiments of the present invention will be described in more detail. It is to be understood that the features of the various exemplary embodiments described herein may be combined with each other unless specifically noted otherwise. Any coupling between components or devices shown in the figures may be a direct or indirect coupling unless specifically noted otherwise. Same reference signs in the various drawings refer to similar or identical components.

Figure 1:
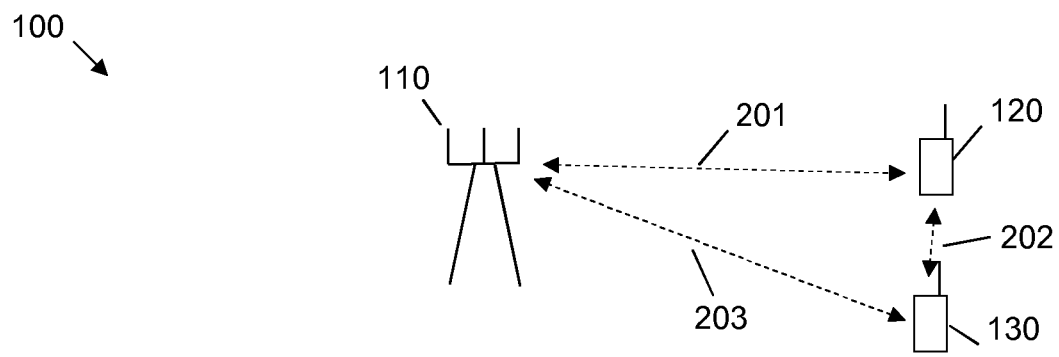
FIG. 1 shows schematically a wireless communication system comprising network nodes according to embodiments of the present invention.

FIG. 1 shows schematically a wireless communication network 100, for example a cellular wireless communication system, operating for example according to 3GPP LTE standards. The wireless communication network 100 may comprise a plurality of base stations, of which in FIG. 1 only one base station 110 is shown. Furthermore, the wireless communication network 100 may comprise a plurality of terminal devices, so-called user equipment (UE) devices, which may communicate with the base station 110. In FIG. 1, two exemplary terminal devices 120 and 130 are shown. Each of the terminal devices 120, 130 may communicate directly with the base station 110 as indicated by the wireless communication arrows 201 and 203. However, in particular in case the terminal device 130 is an Internet of Things (IoT) device, the terminal device 120 may act as a relay device and may relay the communication between the terminal device 130 and the base station 110 as indicated by wireless communication arrows 201 and 202. In this case, the terminal device 120 is called relay device 120 and communicates wirelessly via a so-called device-to-device or sidelink communication 202 with the terminal device 130, and forwards information from the terminal device 130 to the base station 110 via the wireless communication connection 201. As the terminal device 130 may be separated and spaced apart from the relay device 120, the terminal device 130 will be called in the following remote terminal device 130.

In the above summary of the invention and in the appended claims, generic terms for identifying devices and messages are used. In the following detailed description of the embodiments, more functional terms for identifying devices and messages are used. Therefore, first device corresponds to remote terminal device, second device corresponds to relay device, first message corresponds to relay request, second message corresponds to bearer request, third message corresponds to bearer response, and fourth message corresponds to relay response.

Fundamentals concerning signaling, connection setup and protocol stacks in LTE systems as well as device-to-device communication and Internet of Things may be found for example in 3GPP TS 36.300, 3GPP TR 23.703, and 3GPP TR 23.720, whose disclosure is included into this description by reference.

Figure 2:
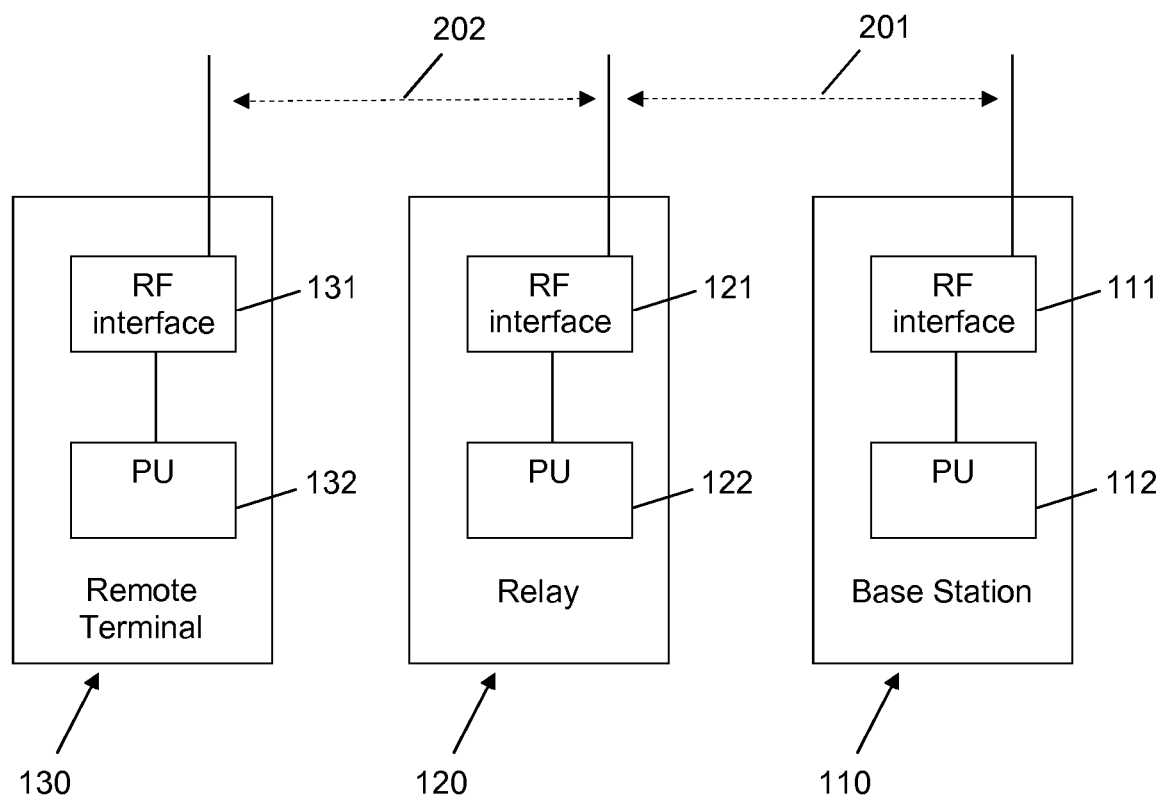
FIG. 2 shows schematically details of a remote terminal device, a relay device, and a base station according to embodiments of the present invention.

FIG. 2 shows the remote terminal device 130, the relay device 120 and the base station 110 in more detail. The remote terminal device 130 comprises a radio frequency (RF) interface 131 and a processing unit (PU) 132. The radio frequency interface 131 is configured for communicating with the relay device 120 via a device-to-device communication 202. However, although not shown in FIG. 2, the radio-frequency interface 131 may also be configured to communicate directly with the base station 110.

The relay device 120 comprises a radio frequency (RF) interface 121 and a processing unit (PU) 122. The radio frequency (RF) interface 121 is configured to communicate via the device-to-device communication 202 with the remote terminal 130 and additionally via a direct communication 201 with the base station 110. Although in FIG. 2 the radio frequency interface 121 is shown as a single entity, the radio frequency interface 121 may comprise more than one entity, for example one radio frequency interface for the device-to-device communication with the remote terminal device 130 and another radio frequency interface for the communication with the base station 110.

The base station 110 comprises a radio frequency (RF) interface 111 and a processing unit (PU) 112. The radio frequency interface 111 is configured to communicate via the connection 201 with the relay device 120.

Operation of the processing units 112, 122 and 132 of the base station 110, the relay device 120, and the remote terminal device 130, respectively, will be described in more detail in connection with exemplary embodiments in connection with FIGS. 3 to 5.

Figure 3:
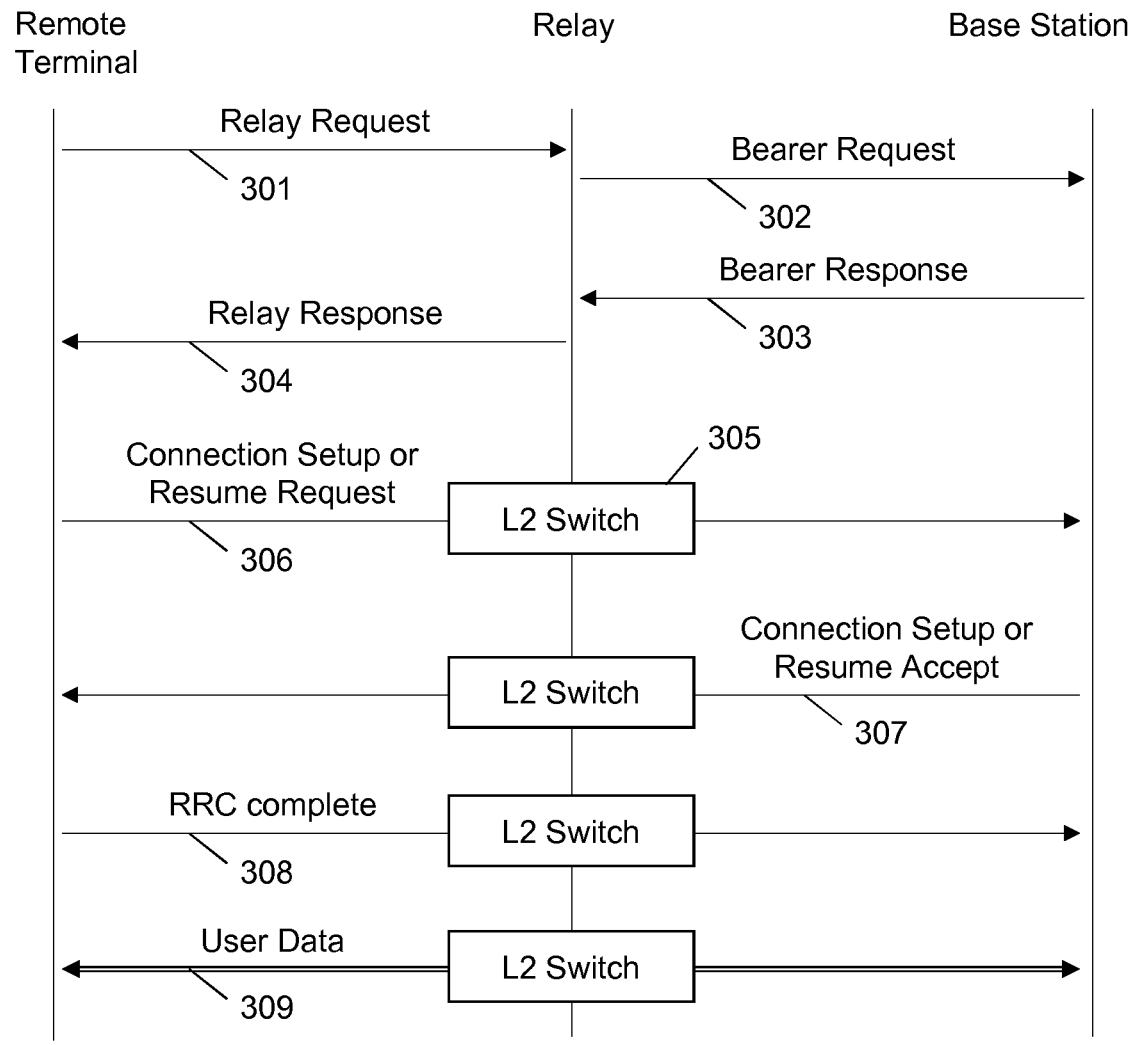
FIG. 3 shows method steps of a method according to an embodiment of the present invention.

In FIG. 3 it is assumed that the relay device 120 is in a so-called connected mode, which means that the relay device 120 is switched on and a radio resource control connection is established between the relay device 120 and the base station 110. In step 301 the remote terminal device 130 sends a device-to-device or sidelink message to the relay device 120 requesting the relay device 120 to start a relay functionality (relay request). As the relay device 120 is in connected mode with the base station 110, the relay device 120 may set up a new bearer between the relay device 120 and the base station 110 by requesting a new bearer set up in step 302 (bearer request). The purpose is to create a signaling tunnel between the base station 110 and the remote device 130. This bearer may be used by a plurality of remote terminal devices connected via the relay device 120 and may therefore already exist. In case the tunneling bearer already exists, the step 302 is optional. Since the relay device 120 establishes this bearer not for its own user data, but for tunneling relay data from the remote terminal device 130, this may be indicated in the bearer request by a corresponding cause value, for example "relay". In response to the bearer request, the base station 110 may transmit a bearer response message in step 303 indicating the new bearer, for example by a corresponding bearer identifier (ID). Likewise, the bearer response in step 303 may be optional in case the tunneling bearer already exists.

When the relay device 120 has established the new bearer, the relay device 120 may reply back to the remote terminal device 130 in step 304 (relay response) indicating that the relay device 120 has established a layer 2 (data link layer) switching functionality 305 and that the remote device 130 may now send a radio resource control (RRC) signaling message to the base station 110 via the relay device 120 (connection setup or connection resume request) in step 306. The relay response message of step 304 may indicate an identifier which may be used by the remote terminal device 130 as a destination for the communication with the base station 110. The identifier may comprise for example a bearer identifier, a logical channel identifier, or a medium access control identifier.

The radio resource control signaling in step 306 may comprise for example a resume request for a user plane solution or a non-access stratum (NAS) message indicating that this is for a control plane solution. The NAS message may include an encrypted protocol data unit (PDU) carrying user data.

It is to be noticed that the base station 110 is prepared for the connection setup or resume request in step 306 from the remote terminal device 130, because the new bearer tunnel has been set up in steps 302 and 303. Therefore, Random Access (RA) and Random Access Response (RAR) messages are not needed before the connection setup or resume request, as it is conventionally required. In step 307 the base station 110 accepts the connection setup or resume request by a corresponding message which is also forwarded by the layer 2 switch of the relay device 120 to the remote terminal device 130. The remote terminal device 130 indicates the completion of the connection setup or connection resume by a radio resource control (RRC) compete message in step 308. The RRC connection setup complete message is also forwarded via the layer 2 switch in the relay device 120 to the base station 110.

Finally, user data can be transmitted between the remote terminal device 130 and the base station 110 in step 309 using the layer 2 switching functionality of the relay device 120.

Figure 4:
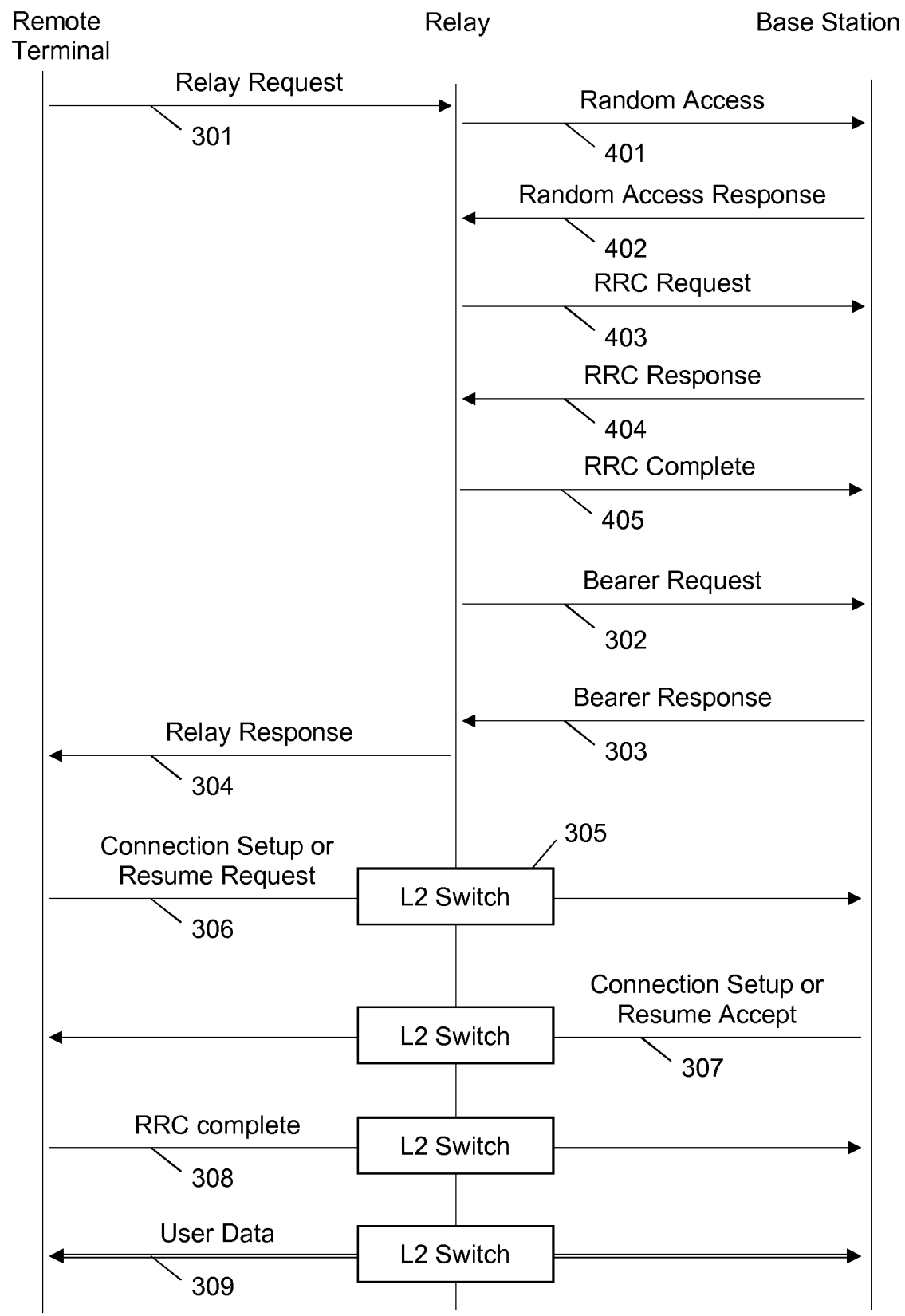
FIG. 4 shows method steps of a method according to a further embodiment of the present invention.

FIG. 4 shows a scenario in which the relay device 120 is in idle mode and therefore no bearer is established between the relay device 120 and the base station 110. In this case, when the relay request (step 301) is received from the remote terminal device 130, this will trigger the relay device 120 to perform the conventional random access procedure. In detail, after receiving in step 301 the relay request from the remote terminal 130, the relay device 120 transmits a random access (RA) message in step 401 to the base station. The base station responds with a random access response (RAR) message in step 402, and a radio bearer is established between the relay device 120 and the base station 110 by transmitting a corresponding radio resource control request in step 403 from the relay device 120 to the base station 110, by responding a corresponding radio resource control response in step 404 from the base station 110 to the relay device 120, and by completing the connection set up by the radio resource control connection complete message from the relay device 120 to the base station 110 in step 405. The relay device 120 is then in the connected state and the procedure as described above in connection with FIG. 3 starting from step 303 may be continued to set up the relayed communication between the remote terminal device 130 and the base station 110.

Figure 5:
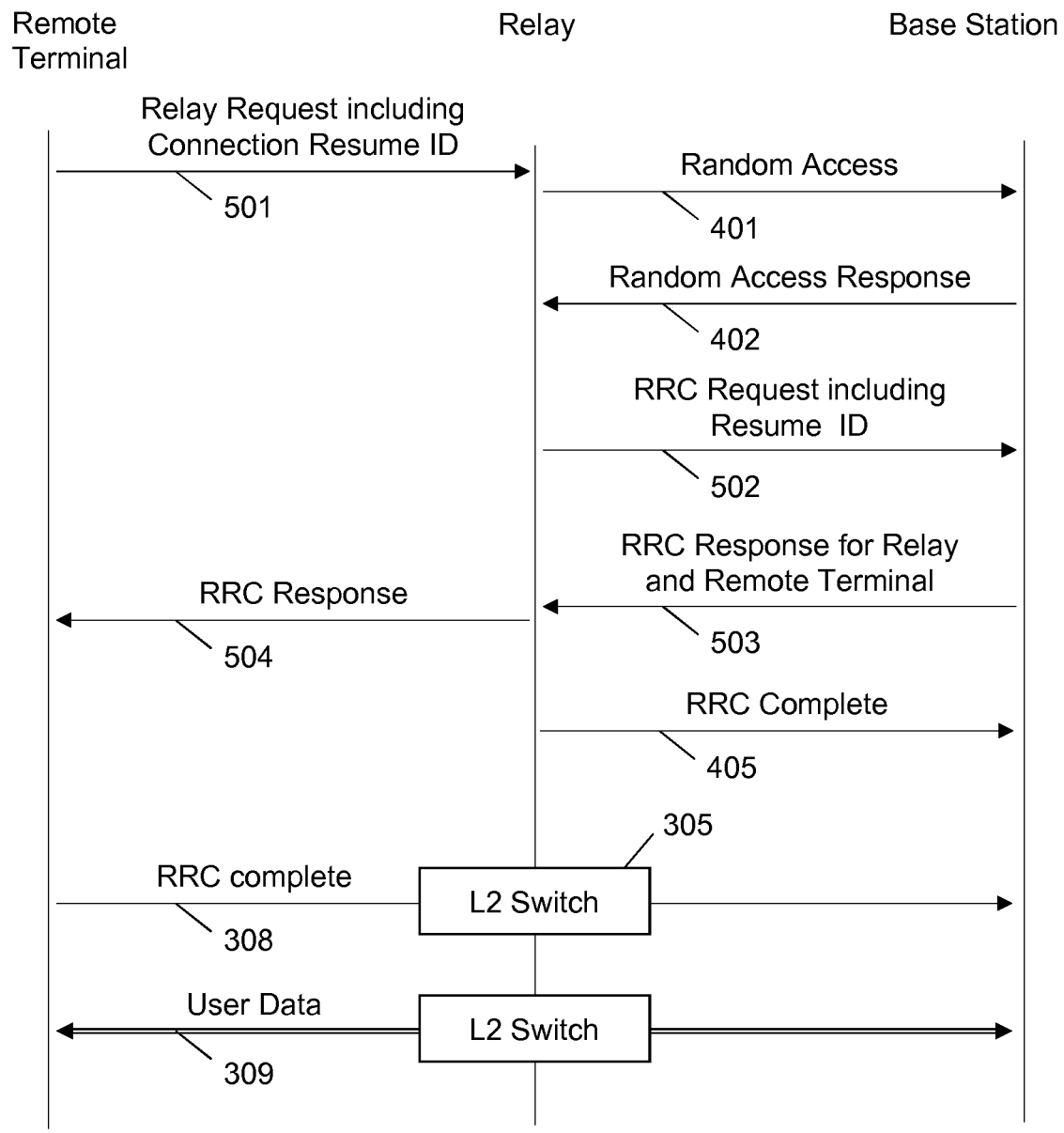
FIG. 5 shows method steps of a method according to yet a further embodiment of the present invention.

FIG. 5 shows an optimized message flow for the case, when the relay device 120 is in idle mode. In this optimized message flow, the relay request also includes the resume ID from the remote terminal device 130 in step 501. In the message flow shown in FIG. 5, the radio resource control request and radio resource control response messages in steps 502 and 503 combine the radio resource control requests and responses from the relay device 120 and the remote terminal device 130. In detail, the radio resource control request in step 502 comprises the requests of steps 403 and 306 of FIG. 4, and the radio resource control response message in step 503 comprises the responses of steps 404 and 307 of FIG. 4. For example, the radio resource control response in step 503 may provide a bearer ID for the relay device 120 and another bearer ID for the remote terminal device 130. The relay device 120 will forward the bearer ID for the remote terminal device 130 in the radio resource control response in step 504. Both, the relay device 120 and the remote terminal device 130 will then send their separate radio resource control complete messages using the respective bearers in steps 405 and 308.

Once the radio resource control connection is established between the remote terminal device 130 and the base station 110, data between the remote terminal device 130 and the base station 110 is protected by for example an end-to-end NAS encryption or AS encryption between the PDCP layers in the base station 110 and the remote terminal device 130. The relay device 120 only forwards the radio link control packets between the two nodes.

The invention claimed is:

1. A method for establishing or resuming a wireless communication connection in a wireless communication network, the method comprising:
 transmitting a first message from a first device of the wireless communication network to a second device of the wireless communication network, the first message comprising a request for the second device to provide a data link layer communication forwarding between the first device and a base station of the wireless communication network;
 upon the second device receiving the first message, transmitting a second message from the second device to the base station, the second message comprising a request to the base station for a resource for the data link layer communication forwarding between the first device and the base station; and
 establishing or resuming a connection between the first device and the base station via the data link layer communication forwarding of the second device,
 wherein data received from the first device is relayed at the data link layer of the second device using the resource to the base station,
 wherein data received using the resource from the base station is relayed at the data link layer of the second device to the first device.

2. The method according to claim 1, wherein the second message comprises an indication that the resource is intended to be used for the data link layer communication forwarding between the first device and the base station.

3. The method according to claim 2, further comprising:
upon the second device receiving the second message, the base station transmitting a third message to the second device, the third message comprising an indication of the resource for the data link layer communication forwarding between the first device and the base station.

4. The method according to claim 3, wherein the second message further comprises a request to the base station for establishing a connection for controlling radio resources for a communication between the second device and the base station.

5. The method according to claim 4, wherein the third message further comprises an indication of the connection for controlling radio resources for the communication between the second device and the base station.

6. The method according to claim 1, further comprising:
the second device transmitting to the first device a fourth message comprising an identifier to be used for routing information to be sent from the first device via the data link layer communication forwarding to the base station.

7. The method according to claim 1, wherein establishing or resuming the connection between the first device and the base station further comprises:
transmitting a connection setup request or a connection resume request from the first device to the base station via the data link layer communication forwarding of the second device.

8. The method according to claim 7, wherein the connection resume request comprises a resume identifier for identifying a previous connection between the first device and the base station.

9. The method according to claim 1, further comprising:
transmitting payload information between the first device and the base station via the data link layer communication forwarding of the second device.

10. The method according to claim 1, further comprising:
the second device provide the data link layer communication forwarding responsive to the second device receiving the first message.

11. A base station for a wireless communication network, the base station comprising:
a radio interface communicating with a second device of the wireless communication network, and
a processing unit configured to establish or resume a connection between a first device of the wireless communication network and the base station via a data link layer communication forwarding of the second device, wherein the data link layer communication forwarding is provided by the second device upon:
the second device receiving a first message from the first device, the first message comprising a request for the second device to provide the data link layer communication forwarding between the first device and the base station of the wireless communication network;
the second device receiving the first message and transmitting a second message to the base station, the second message comprising a request to the base station for a resource for the data link layer communication forwarding between the first device and the base station; and
the base station receiving the second message the base station transmitting a grant of the resource, wherein the resource provides:
data received from the first device being relayed at the data link layer of the second device using the resource to the base station; and
data received using the resource from the base station being relayed at the data link layer of the second device to the first device.

12. A second device for a wireless communication network, the second device comprising:
at least one radio interface communicating with a first device of the wireless communication network and a base station of the wireless communication network, and
a processing unit configured to:
receive a first message from the first device, the first message comprising a request for the second device to provide a data link layer communication forwarding between the first device and the base station of the wireless communication network,
upon receiving the first message, transmitting a second message to the base station, the second message comprising a request to the base station for a resource for the data link layer communication forwarding between the first device and the base station, and
provide the data link layer communication forwarding for establishing or resuming a connection between the first device and the base station via the data link layer communication forwarding of the second device, wherein data received from the first device is relayed at the data link layer of the second device using the resource to the base station, and data received using the resource from the base station is relayed at the data link layer of the second device to the first device.

* * * * *